United States Patent
Tsukiyama

(10) Patent No.: US 11,139,691 B2
(45) Date of Patent: Oct. 5, 2021

(54) POWER RECEPTION DEVICE AND POWER RECEPTION CONTROL METHOD

(71) Applicant: DAIHEN Corporation, Osaka (JP)

(72) Inventor: Daisuke Tsukiyama, Osaka (JP)

(73) Assignee: Daihen Corporation, Osaka (JP)

(*) Notice: Subject to any disclaimer, the term of this patent is extended or adjusted under 35 U.S.C. 154(b) by 31 days.

(21) Appl. No.: 16/295,185

(22) Filed: Mar. 7, 2019

(65) Prior Publication Data
US 2019/0296584 A1    Sep. 26, 2019

(30) Foreign Application Priority Data
Mar. 20, 2018  (JP) .............................. JP2018-053354

(51) Int. Cl.
| H02J 50/12 | (2016.01) |
| H02J 50/90 | (2016.01) |
| H02M 7/12 | (2006.01) |
| H02J 7/00 | (2006.01) |
| H02J 50/10 | (2016.01) |

(52) U.S. Cl.
CPC ............ *H02J 50/12* (2016.02); *H02J 7/0029* (2013.01); *H02J 50/10* (2016.02); *H02J 50/90* (2016.02); *H02M 7/12* (2013.01)

(58) Field of Classification Search
CPC .......... H02J 7/0029; H02J 50/12; H02J 50/90; H02J 50/10; H02M 7/12
See application file for complete search history.

(56) References Cited

U.S. PATENT DOCUMENTS

| 2015/0200547 A1* | 7/2015 | Nakashima | B60L 58/12 |
| | | | 307/104 |
| 2015/0229132 A1* | 8/2015 | Katsunaga | B60L 53/122 |
| | | | 307/104 |
| 2016/0164307 A1* | 6/2016 | Shibata | H02J 50/05 |
| | | | 307/104 |
| 2016/0352150 A1 | 12/2016 | Okazaki | |
| 2018/0090995 A1* | 3/2018 | Arasaki | H02H 9/041 |
| 2018/0131411 A1* | 5/2018 | Floresca | H04B 5/0031 |

FOREIGN PATENT DOCUMENTS

| DE | 112016001489 T5 | 1/2018 | |
| EP | 3116097 A | 1/2017 | |
| JP | 2015104253 | 6/2015 | |
| WO | WO-2016042776 A1 * | 3/2016 | ............. H02M 1/00 |

* cited by examiner

*Primary Examiner* — Robert L Deberadinis
(74) *Attorney, Agent, or Firm* — Sterne, Kessler, Goldstein & Fox P.L.L.C.

(57) ABSTRACT

Provided are a power reception device and a power reception control method capable of suppressing the application of an excessive voltage even in the case where a time lag occurs before power transmission by a power transmission device is stopped after disconnection between the power reception device and a load. A power reception device includes: a power reception coil that receives power transmitted from a power transmission coil; a rectification circuit that rectifies alternating current power received by the power reception coil; and a control circuit that is connected between the rectification circuit and a load to which direct current power outputted from the rectification circuit is supplied, and controls that the direct current flowing through the load to be constant or equal to or less than a predetermined value by the direct current power.

5 Claims, 4 Drawing Sheets

POWER RECEPTION DEVICE AND POWER RECEPTION CONTROL METHOD

BACKGROUND

Field

The present invention relates to a power reception device and a power reception control method.

Description of Related Art

Conventionally, a wireless power supply system for transmitting electric power from a power transmission coil of a power transmission device to a power reception coil of a power reception device has been used. The power reception device of the wireless power supply system supplies electric power, which has been wirelessly supplied, to a load such as a battery.

Patent Publication JP-A-2015-104253 discloses a wireless power supply system in which electric power is transmitted from a power transmission-side coil connected to a power source provided at a vehicle to a power reception-side coil, and electric power received by the power reception-side coil is stored in a power storage device. In this wireless power supply system, information relating to the power storage amount of the power storage device is transmitted from the power reception side to the power transmission side, and electric power to be transmitted from the power transmission-side coil to the power reception-side coil is controlled based on the power storage amount of the power storage device.

More specifically, the power storage amount of the power storage device is measured by the power reception device, and when the power storage amount reaches a set value, the power reception device is disconnected from the load, a stop command is transmitted by wireless communication from the power reception device to the power transmission device, and control is performed to stop power transmission from the power transmission device.

SUMMARY

However, where the communication speed between the power transmission device and the power reception device is low, or signal processing in the power transmission device is delayed, a time lag may occur before power transmission by the power transmission device is stopped after disconnection between the power reception device and the load, and an excessive voltage may be instantaneously applied to the power reception device.

It is therefore an object of the present invention to provide a power reception device and a power reception control method capable of suppressing the application of an excessive voltage even in the case where a time lag occurs before power transmission by the power transmission device is stopped after disconnection between the power reception device and the load.

A power reception device according to one aspect of the present invention includes a power reception coil that receives electric power transmitted from a power transmission coil; a rectification circuit that rectifies alternating current power received by the power reception coil; and a control circuit connected between the rectification circuit and a load to which direct current power outputted from the rectification circuit is supplied, wherein the control circuit includes a switch that is connected between a positive electrode and a negative electrode of the load and is switched from a non-conducting state to a conducting state, while electric power transmitted from the power transmission coil is being received by the power reception coil, when a voltage applied to the load becomes equal to or higher than a predetermined value, and a rectification element that is connected between the positive electrode or the negative electrode and the switch and prevents a current from flowing from the positive electrode to the negative electrode through the switch.

According to this aspect, when the voltage applied to the load becomes equal to or higher than a predetermined value, the switch is switched from a non-conducting state to a conducting state, and a positive electrode and a negative electrode of the control circuit are short-circuited, thereby making it possible to suppress the application of an excessive voltage even in the case where a time lag occurs before power transmission by the power transmission device is stopped after disconnection between the power reception device and the load. Further, since the control circuit includes the rectification element, even when the switch is switched from the non-conducting state to the conducting state, the positive electrode and the negative electrode of the load are kept in a state of being not short-circuited. Therefore, for example, when the load is a battery, discharge of the battery is prevented.

In the above aspect, the voltage at the load may change in accordance with the lapse of time for which the direct current power is supplied, and the control circuit may control the direct current flowing through the load to be constant or equal to or less than a predetermined value.

With such a configuration, it is possible to suppress an excessive current from flowing when supplying the direct current power to the load, and to suppress the application of an excessive voltage when disconnecting the power reception device and the load. Further, as a result of controlling the direct current flowing through the load to a constant value or a value equal to or less than a predetermined value by the control circuit, it is not necessary to specially select materials and parts constituting the power reception device as a countermeasure against overcurrent and it will suffice to take only countermeasures against overvoltage. Therefore, the power reception device can be reduced in cost and size.

In the above aspect, the rectification element may be a single semiconductor diode which allows a current flowing into the positive electrode to pass therethrough and blocks a current flowing out from the positive electrode.

With such a configuration, since the control circuit includes a single semiconductor diode as a rectification element, the positive electrode and the negative electrode of the load can be kept, with an inexpensive configuration, from forming a short circuit when the switch is switched from the non-conducting state to the conducting state.

In the above aspect, the rectification element is a second switching unit which is switched from a non-conducting state to a conducting state when the voltage applied to the load becomes equal to or higher than a predetermined value, and which may be controlled so that these conducting state and non-conducting state are reversed with respect to those of the switch.

With such a configuration, since the control circuit includes a second switching unit as the rectification element, the positive electrode and the negative electrode of the load can be kept, with a simple control signal which is inverted with respect to the control signal of the switch, from forming a short circuit when the switch is switched from the non-conducting state to the conducting state.

A power reception control method according to another aspect of the present invention includes the steps of receiving electric power transmitted from a power transmission coil with a power reception coil; rectifying alternating current power received by the power reception coil with a rectification circuit; detecting that a voltage applied to a load, to which a direct current power outputted from the rectification circuit is supplied, has become equal to or higher than a predetermined value with a control circuit connected between the rectification circuit and the load; switching a switch connected between a positive electrode and a negative electrode of the load from a non-conducting state to a conducting state, while the electric power transmitted from the power transmission coil is being received by the power reception coil, when the voltage applied to the load has become equal to or higher than the predetermined value; and preventing a current from flowing from the positive electrode to the negative electrode through the switch with a rectification element connected between the positive electrode or the negative electrode and the switch.

According to this aspect, when the voltage applied to the load becomes equal to or higher than a predetermined value, the switch is switched from a non-conducting state to a conducting state, and a positive electrode and a negative electrode of the control circuit are short-circuited, thereby making it possible to suppress the application of an excessive voltage even in the case where a time lag occurs before power transmission by the power transmission device is stopped after disconnection between the power reception device and the load. Further, even when the switch is switched from the non-conducting state to the conducting state, the positive electrode and the negative electrode of the load are kept by the rectification element in a state of being not short-circuited. Therefore, for example, when the load is a battery, discharge of the battery is prevented.

According to the present invention, it is possible to provide a power reception device capable of suppressing the application of an excessive voltage even in the case where a time lag occurs before power transmission by the power transmission device is stopped after disconnection between the power reception device and the load.

DETAILED DESCRIPTION

Figure 1:
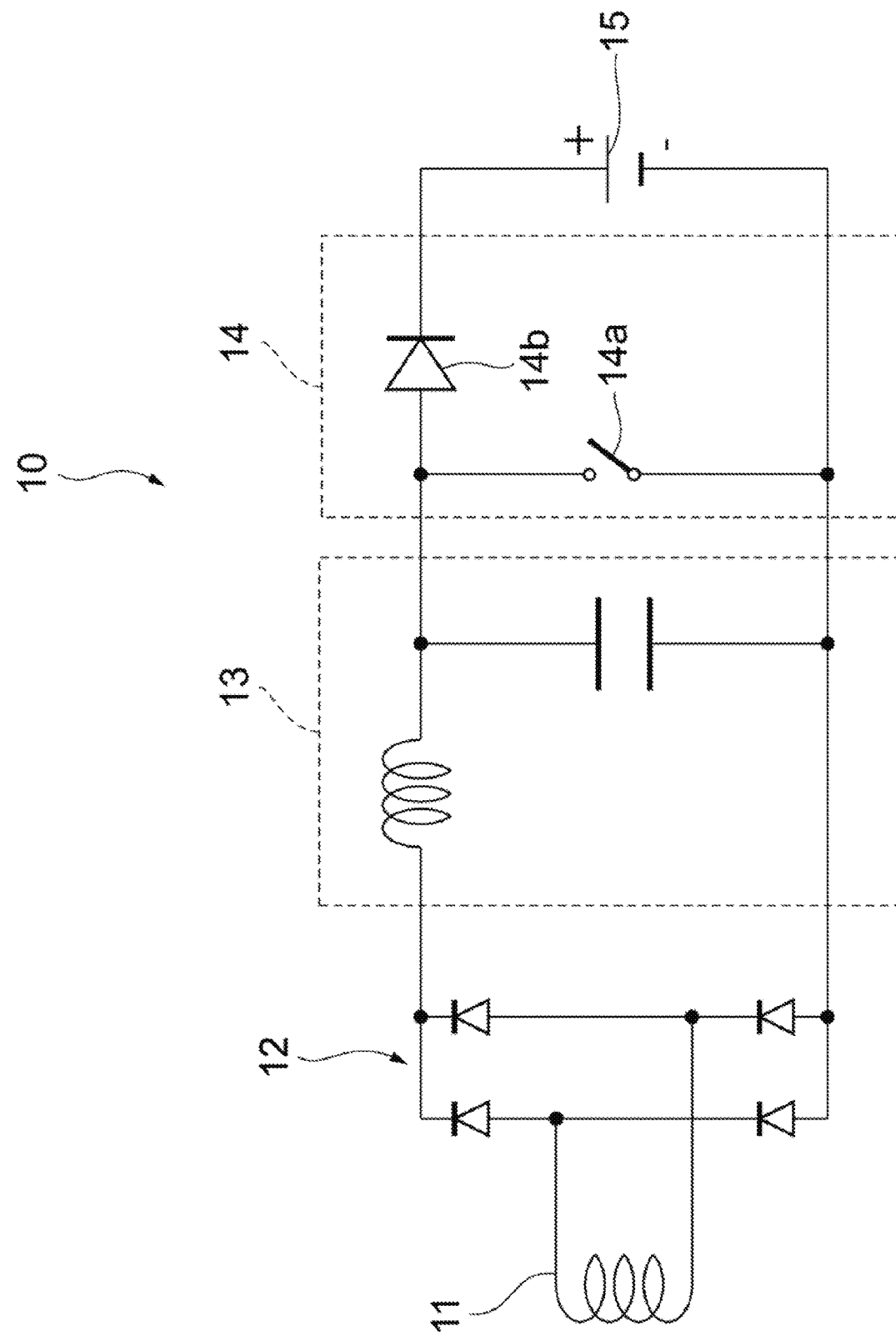
FIG. 1 is a circuit diagram of a power reception device according to an embodiment of the present invention.

Embodiments of the present invention will be described with reference to the accompanying drawings. In the drawings, the same reference numerals are given to the same or similar configurations.

FIG. 1 is a circuit diagram of a power reception device 10 according to an embodiment of the present invention. The power reception device 10 includes a power reception coil 11, a rectification circuit 12, a smoothing circuit 13, a control circuit 14, and a load 15.

The power reception coil 11 receives electric power transmitted from a power transmission coil provided in a power transmission device separate from the power reception device 10. The power reception coil 11 may be a coil that receives alternating current power by magnetic field coupling with the power transmission coil.

The rectification circuit 12 rectifies the alternating current power received by the power reception coil 11 and outputs direct current power. The rectification circuit 12 may be a circuit that includes a plurality of diodes and performs full-wave rectification of the alternating current power received by the power reception coil 11.

The smoothing circuit 13 smoothes the direct current power outputted from the rectification circuit 12. The smoothing circuit 13 may be a circuit that includes a coil and a capacitor and reduces and smooths fluctuations in the direct current power outputted from the rectification circuit 12. In the power reception device 10 according to the present embodiment, the smoothing circuit 13 is connected between the rectification circuit 12 and the control circuit 14.

The load 15 is supplied with the direct current power outputted from the rectification circuit 12 and smoothed by the smoothing circuit 13. When the direct current power is supplied, the voltage at the load 15 may change according to the lapse of time. The load 15 may be, for example, a battery such as a lithium ion capacitor or a lead storage battery, or an actuator such as a motor.

The control circuit 14 is connected between the rectification circuit 12 and the load 15 and controls the direct current flowing through the load 15 to be constant or equal to or less than a predetermined value by the direct current power outputted from the rectification circuit 12. In the power reception device 10 according to the present embodiment, the control circuit 14 is connected between the smoothing circuit 13 and the load 15. The control circuit 14 includes a first switch 14a that is connected between a positive electrode (+) and a negative electrode (−) of the load 15 and is switched from a non-conducting state to a conducting state, while the electric power transmitted from the power transmission coil is being received by the reception coil 11, when a voltage applied to the load 15 satisfies a predetermined condition, and a diode 14b that is connected between the positive electrode (+) or the negative electrode (−) and the first switch 14a and prevents a current from flowing from the positive electrode (+) to the negative electrode (−) through the first switch 14a. Here, the predetermined condition may be that the voltage applied to the load 15 is equal to or higher than a predetermined voltage.

When the voltage applied to the load 15 satisfies a predetermined condition, the first switch 14a is switched by the control circuit 14 from the non-conducting state to the conducting state, and the positive electrode and the negative electrode of the control circuit 14 are short-circuited, thereby making it possible to suppress the application of an excessive voltage even in the case where a time lag occurs before power transmission by the power transmission device is stopped after disconnection between the power reception device 10 and the load 15. Further, since the control circuit 14 includes the diode 14b, the positive electrode (+) and the negative electrode (−) of the load 15 are kept in a state of being not short-circuited even when the first switch 14a has been switched from the non-conducting state to the conducting state.

In the power reception device 10 according to the present embodiment, the diode 14b may be a single semiconductor diode which allows a current flowing into the positive electrode (+) of the load 15 to pass therethrough and blocks a current flowing out from the positive electrode (+). Since the control circuit 14 includes a single semiconductor diode as the diode 14b, the positive electrode (+) and the negative electrode (−) of the load 15 can be kept, with an inexpensive configuration, from forming a short circuit when the first switch 14a is switched from the non-conducting state to the conducting state.

Further, the first switch 14a may be a semiconductor transistor. A control signal may be inputted to the gate electrode of the semiconductor transistor, and the control signal may be a signal that causes conduction between the source electrode and the drain electrode of the semiconductor transistor when the voltage applied to the load 15 satisfies a predetermined condition, and a signal that does not cause conduction between the source electrode and the drain electrode of the semiconductor transistor when the voltage applied to the load 15 does not satisfy a predetermined condition.

Figure 2:
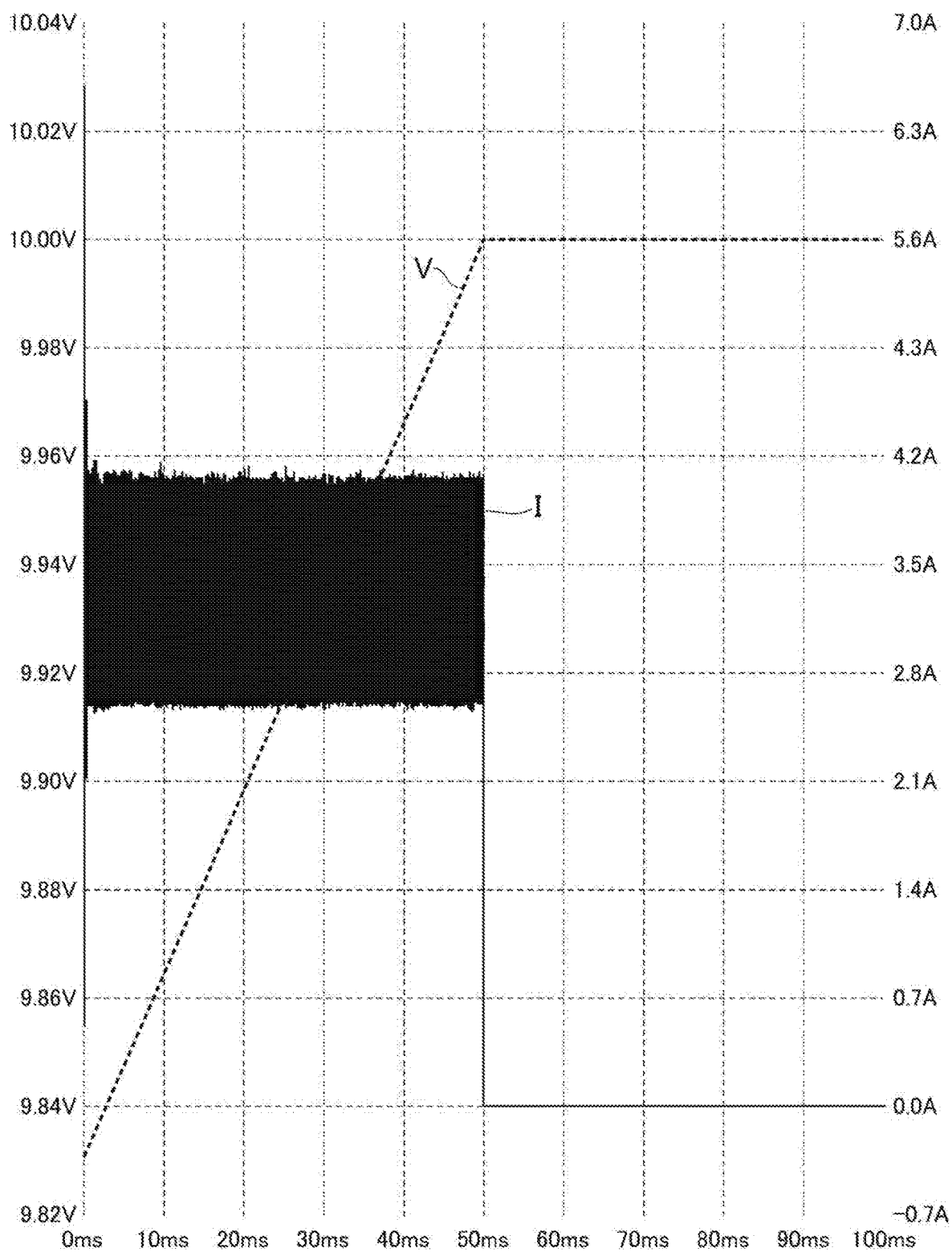
FIG. 2 is a graph showing a current flowing through a load of the power reception device according to the embodiment of the present invention and a voltage applied to the load.

FIG. 2 is a graph showing a current I flowing through the load 15 of the power reception device 10 according to the embodiment of the present invention and a voltage V applied to the load 15. In the figure, the current I flowing through the load 15 is indicated by a solid line, and the units thereof are indicated by A (ampere) on the right ordinate. The voltage V applied to the load 15 is indicated by a broken line, and the units thereof are indicated by V (volt) on the left ordinate. The abscissa shows elapsed time in units of milliseconds (ms). In this example, the load 15 is a battery.

FIG. 2 shows a case where reception of electric power by the power reception coil 11 is started at 0 ms and charging is performed by supplying direct current power to the load 15 (battery). In this example, when reception of electric power by the power reception coil 11 is started, the control circuit 14 controls the current I flowing through the load 15 to be constant or equal to or less than a predetermined value. In the case of this example, the control circuit 14 performs control so that the time average of the current I is constant. As a result, it is possible to suppress an excessive current from flowing when supplying direct current power to the load 15. Further, in the case of this example, the voltage at the load 15 changes in accordance with the lapse of time for which the direct current power is supplied. More specifically, the load 15 may be a lithium ion capacitor or the like, and the voltage thereof may increase as the direct current power is supplied and the amount of stored power increases. In this example, the predetermined condition for bringing the first switch 14a of the control circuit 14 from the non-conducting state to the conducting state is that the voltage applied to the load 15 is 10 V or more. Therefore, the first switch 14a is switched from the non-conducting state to the conducting state when the voltage applied to the load 15 becomes 10 V after the lapse of 50 ms from the start of power reception. In the case where the first switch 14a is in the non-conducting state, that is, from 0 ms to 50 ms, the current I flowing through the load 15 is about 2.6 A to 4.0 A. Meanwhile, after 50 ms when the first switch 14a is switched from the non-conducting state to the conducting state, the current I flowing through the load 15 is 0 A, and it can be confirmed that electric power is not supplied to the load 15. Also, after 50 ms when the first switch 14a is switched from the non-conducting state to the conducting state, it can be confirmed that the voltage applied to the load 15 is kept constant at 10 V and that the positive electrode (+) and the negative electrode (−) of the load 15 are kept from forming a short circuit by the diode 14b.

Where the direct current flowing through the load 15 is not controlled to be constant or equal to or lower than the predetermined value, that is, when a current (overcurrent) equal to or higher than a rated current can flow to the power reception device 10, materials and parts that can withstand the overcurrent need to be selected to configure the power reception device 10. For example, it is necessary to select a coil with a larger number of winding turns as the power reception coil 11, and the size of the power reception coil 11 is increased. In addition, it is necessary to select a circuit with a larger number of capacitors connected in parallel as the smoothing circuit 13, and the size of the smoothing circuit 13 is increased. Further, when the first switch 14a is configured of an field effect transistor (FET), it is necessary to select an FET with a larger heat sink, and the size of the control circuit 14 is increased. Thus, when the direct current flowing through the load 15 is not controlled to be constant or equal to or less than the predetermined value, it is necessary to withstand a current equal to or higher than the rated current, and the size of the power reception device 10 is therefore increased.

Meanwhile, when the direct current flowing through the load 15 is controlled to be constant or equal to or lower than the predetermined value, it is necessary to configure the power reception device 10 by selecting materials and parts that can withstand overvoltage, but in general, materials and parts that can withstand overvoltage are smaller, richer in variety and less expensive than materials and parts that can withstand overcurrent. Further, where the direct current flowing through the load 15 is constant or equal to or less than the predetermined value, it is not necessary to select a coil with a larger number of winding turns as the power reception coil 11, and the size of the power reception coil 11 can be reduced. In addition, it is not necessary to select a circuit with a larger number of capacitors connected in parallel as the smoothing circuit 13, and the size of the smoothing circuit 13 can be reduced. Furthermore, when the first switch 14a is configured of an FET, it is not necessary to select an FET with a larger heat sink, and the size of the control circuit 14 can be reduced. Thus, as a result of controlling the direct current flowing through the load 15 to a constant value or a value equal to or less than a predetermined value by the control circuit 14, it is not necessary to specially select materials and parts constituting the power reception device 10 as a countermeasure against overcurrent and it suffice to take only countermeasures against overvoltage. Therefore, the power reception device 10 can be reduced in cost and size.

With the power reception device 10 according to the present embodiment, the following power reception control method is executed. First, in the power reception control method according to the present embodiment, electric power transmitted from the power transmission coil is received by the power reception coil 11, and the alternating current power received by the power reception coil 11 is subsequently rectified by the rectification circuit 12. Then, it is detected with the control circuit 14 that the voltage applied to the load 15 has become equal to or higher than the predetermined value, and when the voltage applied to the load 15 has become equal to or higher than the predetermined value, the first switch 14a connected between the positive electrode (+) and the negative electrode (−) of the load 15 is switched from the non-conducting state to the conducting state, while the electric power transmitted from the power transmission coil is being received by the power reception coil 11, and a current is prevented by the rectification element 14b from flowing from the positive electrode (+) to the negative electrode (−) through the first switch 14a.

According to the power reception control method according to the present embodiment, when the voltage applied to the load 15 becomes equal to or higher than the predetermined value, the first switch 14a is switched from the non-conducting state to the conducting state, and the positive electrode and the negative electrode of the control circuit 14 are short-circuited, thereby making it possible to suppress the application of an excessive voltage even in the case where a time lag occurs before power transmission by the power transmission device is stopped after disconnection between the power reception device 10 and the load 15. Further, the positive electrode (+) and the negative electrode (−) of the load 15 are kept by the rectification element 14b in a state of being not short-circuited even when the first switch 14a has been switched from the non-conducting state to the conducting state. Therefore, for example, when the load 15 is a battery, discharge of the battery is prevented.

Figure 3:
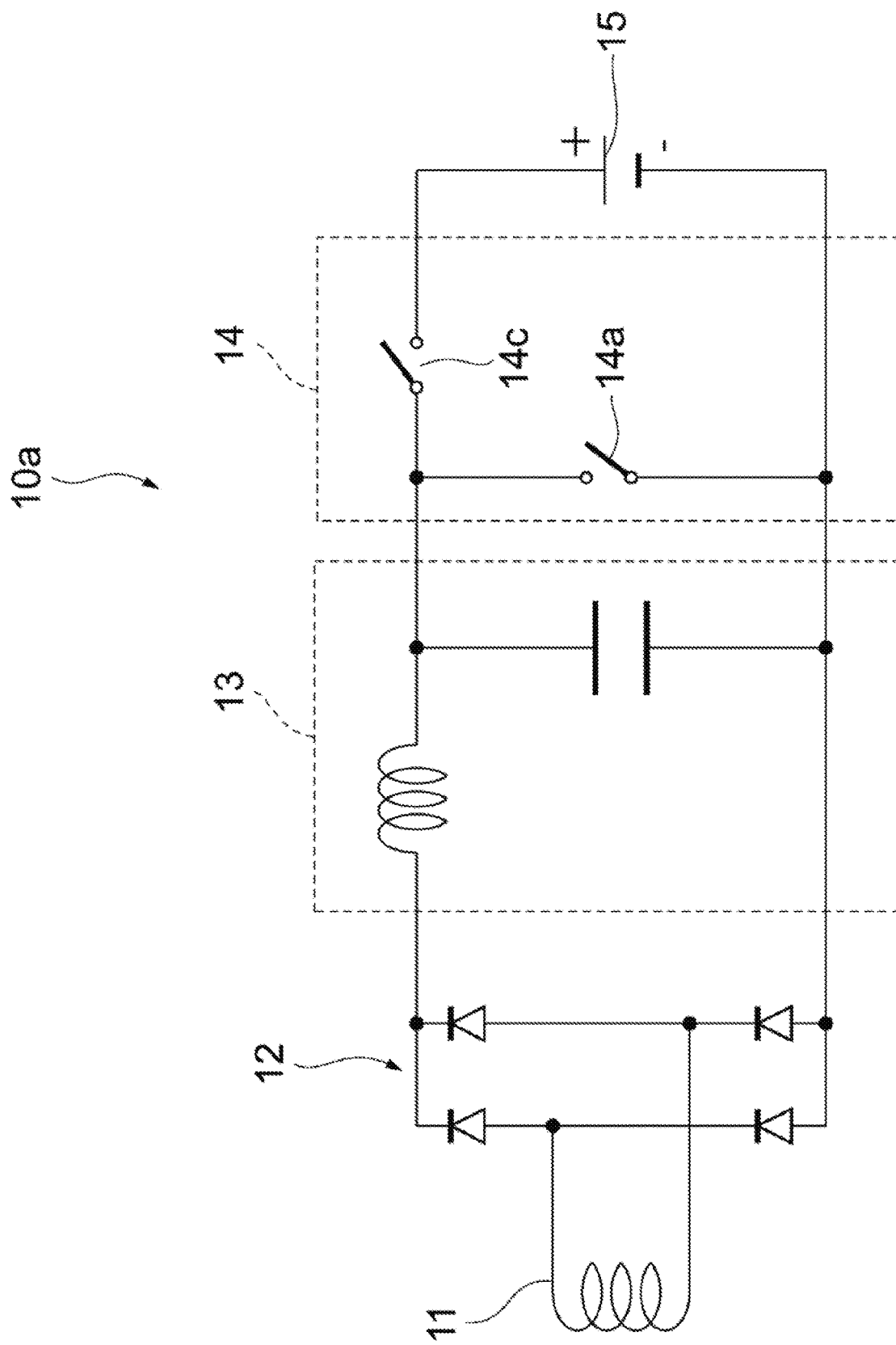
FIG. 3 is a circuit diagram of a power reception device according to a first modification example of the embodiment of the present invention.

FIG. 3 is a circuit diagram of a power reception device 10a according to a first modification example of the embodiment of the present invention. The power reception device 10a according to the first modification example is different from the power reception device 10 according to the present embodiment in that the control circuit 14 includes a second switching unit 14c and does not include the diode 14b. Other features of the power reception device 10a according to the first modification example are the same as those of the power reception device 10 according to the present embodiment.

The second switching unit 14c is switched from a non-conducting state to a conducting state when the voltage applied to the load 15 satisfies a predetermined condition, and is controlled so that these conducting state and non-conducting state are reversed with respect to those of the first switch 14a. The second switching unit 14c may be a semiconductor transistor, and a control signal may be inputted to the gate electrode of the second switching unit 14c. The control signal inputted to the gate electrode of the second switching unit 14c may be inverted with respect to the control signal inputted to the gate electrode of the first switch 14a. That is, the control signal inputted to the gate electrode of the second switching unit 14c is a signal that causes conduction between the source electrode and the drain electrode of the second switching unit 14c when the voltage applied to the load 15 satisfies a predetermined condition, and a signal that does not cause conduction between the source electrode and the drain electrode of the second switching unit 14c when the voltage applied to the load 15 does not satisfy a predetermined condition.

Since the control circuit 14 includes the second switching unit 14c as a rectification element, the positive electrode (+) and the negative electrode (−) of the load 15 can be kept, with a simple control signal which is inverted with respect to the control signal of the first switch 14a, from forming a short circuit when the first switch 14a is switched from the non-conducting state to the conducting state.

Figure 4:
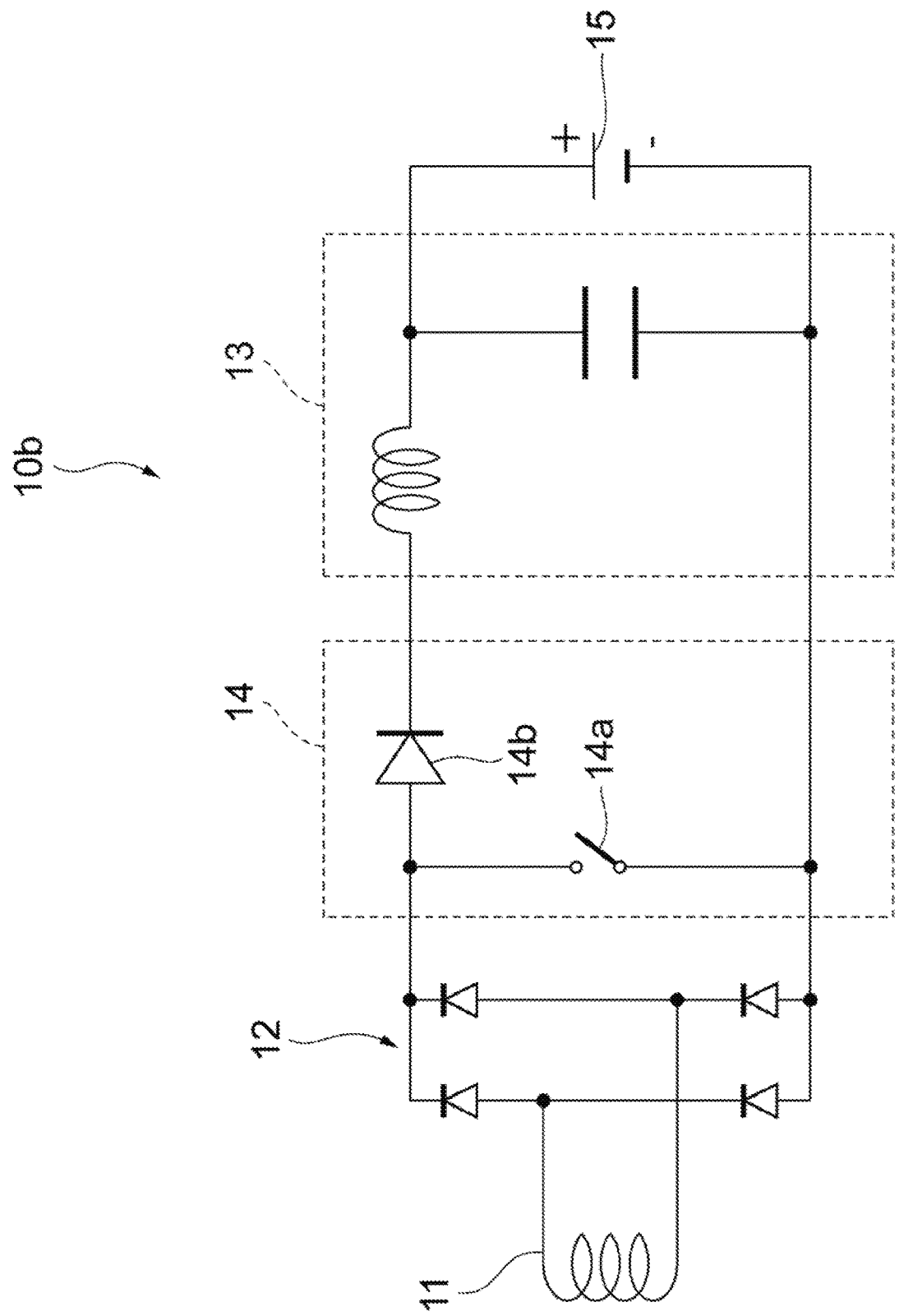
FIG. 4 is a circuit diagram of a power reception device according to a second modification example of the embodiment of the present invention.

FIG. 4 is a circuit diagram of a power reception device 10b according to a second modification example of the embodiment of the present invention. The power reception device 10b according to the second modification example is different from the power reception device 10 according to the present embodiment in that the smoothing circuit 13 is connected between the control circuit 14 and the load 15. Other features of the power reception device 10b according to the second modification example are the same as those of the power reception device 10 according to the present embodiment.

In the power reception device 10b according to the second modification example, the smoothing circuit 13 is provided at the rear stage of the control circuit 14, smoothes the direct current power and supplies the smoothed current to the load 15. The configurations of the control circuit 14 and the smoothing circuit 13 may be the same as those in the power reception device 10 according to the present embodiment, but in the power reception device 10b according to the second modification example, the order of connection between the control circuit 14 and the smoothing circuit 13 is reversed. With such a configuration, when the voltage applied to the load 15 satisfies a predetermined condition, the first switch 14a is switched from the non-conducting state to the conducting state, and the positive electrode (+) and the negative electrode (−) of the control circuit 14 are short-circuited, thereby making it possible to suppress the application of an excessive voltage to the smoothing circuit 13 even in the case where a time lag occurs before power transmission by the power transmission device is stopped after disconnection between the power reception device 10 and the load 15. Therefore, damage of the smoothing circuit 13 can be prevented and the service life of the power reception device 10 can be extended.

The embodiments described above are for facilitating understanding of the present invention and are not intended to limit the present invention. The elements, arrangements, materials, conditions, shapes, sizes, and the like of the embodiments are not limited to those exemplified and can be appropriately changed. In addition, it is possible to partially replace or combine the configurations shown in the different embodiments.

What is claimed is:

1. A power reception device comprising:
   a power reception coil that receives power transmitted from a power transmission coil;
   a rectification circuit that rectifies alternating current power received by the power reception coil;
   a control circuit connected between the rectification circuit and a load to which direct current power outputted from the rectification circuit (12) is supplied;
   a coil connected in series with the output side of the rectification circuit; and
   a capacitor connected with the output side of the coil and connected in parallel with the input side of the control circuit,
   wherein
   the control circuit includes a switch that is connected between a positive electrode and a negative electrode of the load and is switched from a non-conducting state to a conducting state, while power transmitted from the power transmission coil is being received by the power reception coil, when a voltage applied to the load becomes equal to or higher than a predetermined value, and a rectification element that is connected between the positive electrode or the negative electrode and the switch and prevents a current from flowing from the positive electrode to the negative electrode through the switch.

2. The power reception device according to claim 1, wherein
   a voltage at the load changes in accordance with the lapse of time for which the direct current power is supplied, and
   the control circuit controls the direct current flowing through the load to be constant or equal to or less than a predetermined value.

3. The power reception device according to claim 1, wherein the rectification element is a single semiconductor diode which allows a current flowing into the positive electrode to pass therethrough and blocks a current flowing out from the positive electrode.

4. The power reception device according to claim 1, wherein the rectification element is a second switching unit which is switched from a non-conducting state to a conducting state when the voltage applied to the load becomes equal to or higher than a predetermined value, and which is controlled so that the conducting state and the non-conducting state are reversed with respect to those of the switch.

5. A power reception control method comprising:

receiving electric power transmitted from a power transmission coil with a power reception coil;

rectifying alternating current power received by the power reception coil with a rectification circuit;

detecting that a voltage applied to a load has become equal to or higher than a predetermined value with a control circuit connected between the rectification circuit and a load to which direct current power outputted from the rectification circuit is supplied;

smoothing the voltage applied to the load with a coil connected in series with the output side of the rectification circuit and a capacitor connected with the output side of the coil and connected in parallel with the input side of the control circuit, switching a switch connected between a positive electrode and a negative electrode of the load from a non-conducting state to a conducting state, while the power transmitted from the power transmission coil is being received by the power reception coil, when the voltage applied to the load has become equal to or higher than the predetermined value; and preventing a current from flowing from the positive electrode to the negative electrode through the switch with a rectification element connected between the positive electrode or the negative electrode and the switch.

* * * * *